(12) United States Patent
Hansen et al.

(10) Patent No.: US 7,656,614 B2
(45) Date of Patent: Feb. 2, 2010

(54) TAPE DRIVE

(75) Inventors: Lawrence A. Hansen, Boise, ID (US); Paul W. Poorman, Boise, ID (US); Ralph F. Simmons, Jr., Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 664 days.

(21) Appl. No.: 11/528,215

(22) Filed: Sep. 27, 2006

(65) Prior Publication Data

US 2008/0074785 A1    Mar. 27, 2008

(51) Int. Cl.
*G11B 5/00* (2006.01)
(52) U.S. Cl. ....................................................... 360/128
(58) Field of Classification Search .................. 360/128
See application file for complete search history.

(56) References Cited

U.S. PATENT DOCUMENTS

| | | | |
|---|---|---|---|
| 3,380,043 A * | 4/1968 | Carroll, Jr et al. | 360/128 |
| 5,818,668 A | 10/1998 | Gonzales | |
| 6,118,630 A * | 9/2000 | Argumedo | 360/130.21 |
| 6,570,740 B1 * | 5/2003 | Anderson et al. | 360/130.21 |
| 6,666,805 B2 | 12/2003 | Poorman | |
| 6,751,058 B2 * | 6/2004 | von Alten | 360/132 |
| 7,193,813 B2 * | 3/2007 | Biskeborn | 360/122 |
| 7,339,768 B2 * | 3/2008 | Ito et al. | 360/261.1 |
| 7,369,338 B2 * | 5/2008 | Saitou | 360/31 |
| 7,538,982 B2 * | 5/2009 | Ycas | 360/291.2 |

* cited by examiner

*Primary Examiner*—Allen T Cao (57) ABSTRACT

A tape back-up drive having a head assembly. The head assembly includes a head configured to read data from a tape and to write data to the tape. The head assembly also includes at least one tape guide disposed adjacent to the head.

18 Claims, 4 Drawing Sheets

TAPE DRIVE

BACKGROUND

This section is intended to introduce the reader to various aspects of art, which may be related to various aspects of the present invention that are described and claimed below. This discussion is believed to be helpful in providing the reader with background information to facilitate a better understanding of the various aspects of the present invention. Accordingly, it should be understood that these statements are to be read in this light, and not as admissions of prior art.

The loss of computer data can be a serious threat to any business. Backing up computer data can provide some measure of protection against data loss. One technique for backing up data is to record the data onto magnetic tapes. For example, a magnetic tape configured to operate under the Linear-Tape Open ("LTO") standard may be used to back-up the data. Under the LTO format and other formats, data may be recorded on and read from a moving magnetic tape with an electromagnetic read/write head positioned next to the magnetic tape. Unfortunately, the electromagnetic head may be a relatively expensive component of the back-up drive. In addition, the head may need to be replaced due to wear during the life of the back-up drive.

Moreover, many personal computers and servers are provided with expansion slots where add-on units may be added inside the case or housing of the computer. However, the space available for each expansion slot may be limited, and therefore tape back-up systems designed to plug into such expansion slots benefit from a relatively thin aspect ratio. Indeed, there may be significant constraints on the thickness dimension of such back-up tape drives.

DETAILED DESCRIPTION OF SPECIFIC EMBODIMENTS

Figure 1:
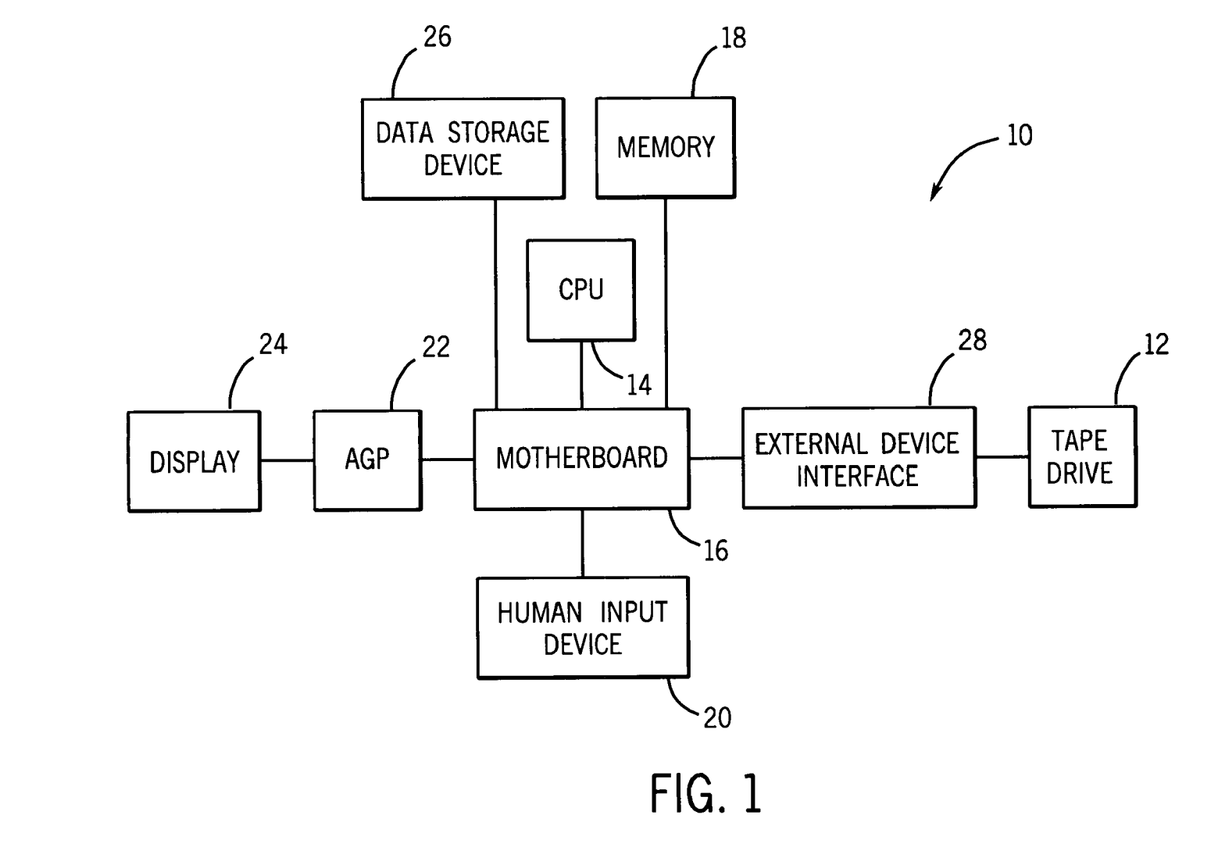
FIG. 1 is a block diagram of a computer system (e.g., server) having a tape back-up drive in accordance with one embodiment of the present invention.

FIG. 1 depicts a block diagram of an exemplary computer system 10 having a tape drive 12 (e.g., a magnetic tape back-up drive). As will be described in further detail below, the tape drive 12 is configured with a new head assembly incorporating guides (e.g., stationary guides) and a reduced-size head. In certain embodiments, the tape drive 12 may also be relatively smaller (i.e., a smaller form factor) to fit into a reduced-size computer chassis or slots, if desired. The tape drive 12 may be mounted within a computer chassis or mounted externally. In one example, the tape drive 12 incorporates the HP Ultrium LTO (Linear Tape-Open) technology format manufactured by the Hewlett Packard Company of Palo Alto, Calif.

The computer system 10 may include one or more processors or central processing units ("CPUs") 14. While the CPU 14 will be referred to primarily in the singular, it will be understood that a computer system 10 with any number of physical or logical CPUs 14 may be implemented. Examples of suitable CPUs 112 include the Intel Pentium 4 Processor, the Intel Xeon Processor, the AMD Opteron, and so-forth. The CPU 14 may be communicatively coupled to a motherboard 16 of the computer system 10. In various embodiments, the motherboard 16 controls the routing of signals and instructions within the computer 10.

The motherboard 16 may be communicatively coupled to one or more memory devices 18 (e.g., dynamic random access memory ("DRAM"), basic input/output system ("BIOS"), read-only memory ("ROM"), etc.). A memory device 18 may store code or instructions for setting up or configuring the operation of the computer system 10. In addition, a variety of human input devices 20, such as the keyboard and/or a mouse, may be communicatively coupled to the motherboard 16. The motherboard 16 may also be communicatively coupled to a graphical interface, such as an accelerated graphics port ("AGP") 22. For example, the AGP 22 can transmit graphical data through an AGP video card to a video display 24, which can display graphical data for a user.

The motherboard 16 may also be communicatively coupled to a data storage device 26, which may include any one of a variety of suitable data storage devices. For example, in one embodiment, the data storage device 26 is an Integrated Drive Electronics (IDE) or Advanced Technology Attachment (ATA) hard drive. In alternate embodiments, the data storage device 26 may be a small computer system interface ("SCSI") drive or a fiber channel drive. In still other embodiments, the data storage device 26 may be a solid state data storage device or optical data storage device.

The motherboard 12 may be communicatively coupled to an external device interface 28, which may be any suitable form of computer interface. For example, the external device interface 28 may be a Peripheral Components Interconnect ("PCI") interface, a PCI-X interface, a PCI Express interface, a Fiber channel interface, a fiber optic interface, a Small Computer System Interface ("SCSI"), an Ethernet interface, a Universal Serial Bus ("USB") interface, a Firewire interface, a Fiber-SCSI interface, a Serial Advance Technology Attachment ("SATA") interface, a Serial Attached SCSI ("SAS") interface, and so forth. The interface 28 may include ports, a wireless connection, a cabled connection, a network interface card (NIC), and so on. The interface 28 may be communicatively coupled to one or more external devices, such as a storage device, a network interface, and so forth. The computer system 10 may be connected to a network, such as an Ethernet network, a Gigabit network, a wireless network, and so forth.

In the illustrated embodiment, the tape drive 12 is communicatively coupled to the external device interface 28. However, in alternate embodiments, the tape drive 12 may be connected elsewhere in the computer system 10. For example, the tape drive 12 may be coupled directly to a motherboard 16 (or bridge, etc.) or coupled to the motherboard 16 via a dedicated card or interface, for example.

Lastly, it should be noted that the embodiment of the computer system 10 illustrated in FIG. 1 is merely one exemplary embodiment of the computer system 10. For example, in alternate embodiments, the computer system 10 may include thin client systems, distributed computer systems, servers, personal digital assistants, and/or wireless telephones. As such, in alternate embodiments, the above described elements may be reconfigured and/or certain elements omitted from the computer system 10. In another example, the memory 18 and/or the external device interface 28 may be coupled directly to the CPU 14. Moreover, additional components may be included in the computer system 10.

Figure 2:
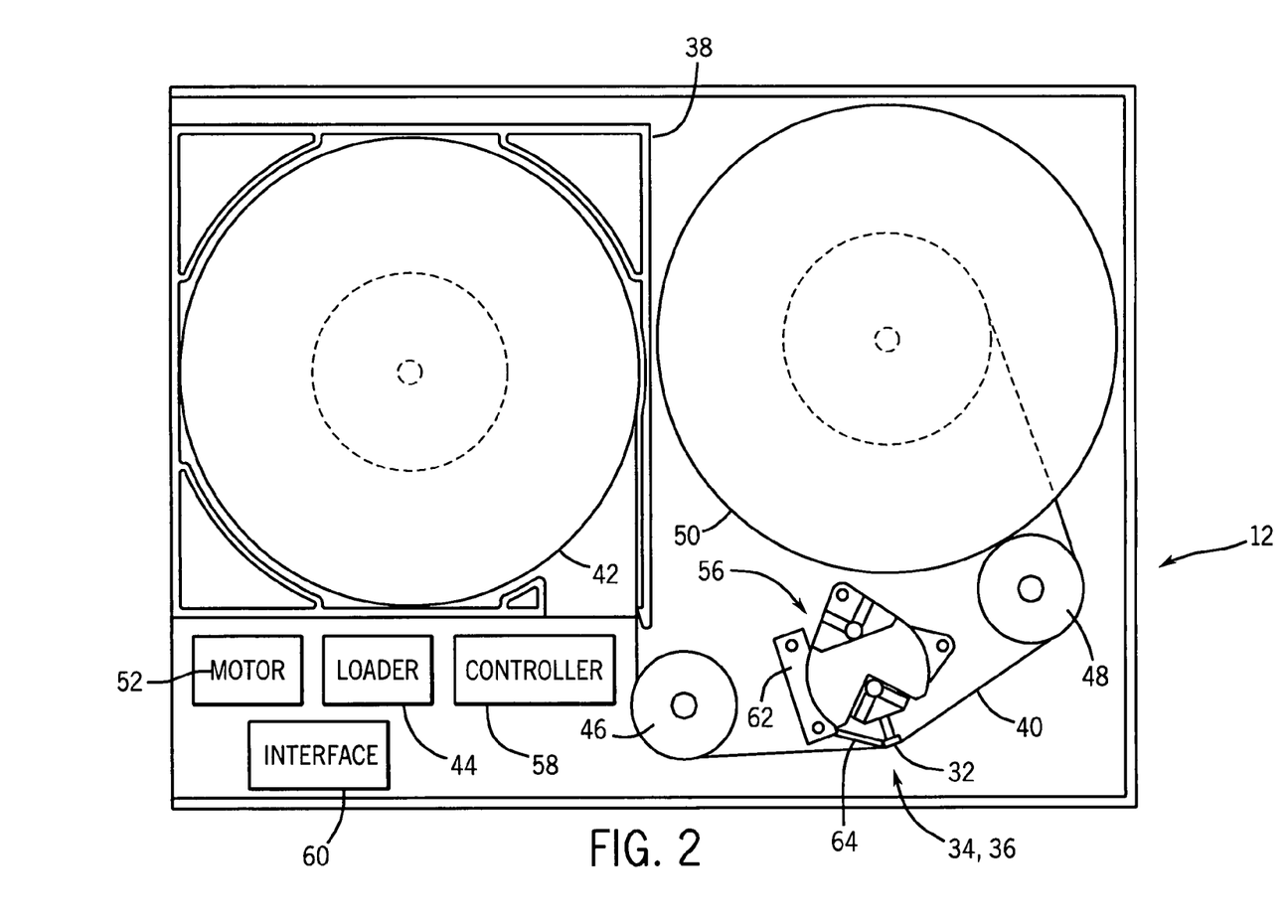
FIG. 2 is a diagrammatical representation of a tape back-up drive in accordance with one embodiment of the present invention.

FIG. 2 depicts an exemplary tape drive 12 that may be used with single spool tape cartridges. The tape drive 12 includes a head assembly 32 having a magnetic read/write head 34 and guides 36 (e.g., stationary guides). See FIGS. 3 and 4 for more detailed illustrative embodiments of the head assembly 32. In the illustrative embodiment of FIG. 2, a single spool tape cartridge 38 may be inserted in the tape drive 12 for read and write operations. The exemplary tape cartridge 38 depicted includes a magnetic tape 40 wound on a single supply spool 42. A loader 44 of the tape drive 12 may facilitate insertion of the tape cartridge 38 into the tape drive 12. When the tape cartridge 38 is inserted into the tape drive 12, the drive 12 may grab a leader of the tape 40 to pull the tape 40. Within the tape drive 12, the head assembly 32 engages the magnetic tape 40.

A first tape guide 46 and a second tape guide 48 (e.g., rollers) disposed separate from the head assembly 32 facilitate serial movement of the magnetic tape 40 through the tape drive 12 and onto a take-up spool 50 of the tape drive 12. In addition, one or more motors 52 of the tape drive 12 may provide a motive force for the serial movement of the tape 40 through the tape drive 12 and around components of the tape drive 12.

The tape 40 typically has a relatively thin coating of magnetic material. In certain embodiments, the magnetic tape 40 may be up to 800 meters long or longer. It should be noted that the longer the tape 40, the more difficult it may be to maintain tracking performance of the head 34 with the tape 40 due to stresses and distortions in the tape 40 as the tape drive 12 is pulling or driving the long tape 40 through the drive 12. In response, stationary guides 36 may provide for non-moving support to the tape 40 and improved tracking performance of the head 34 to the tape 40.

The head 34 may be mounted to a moving part (e.g., porter 54) of an actuator assembly 56. The actuator assembly 56 positions the head 34 over the desired track or tracks on tape 40 by providing for movement of the head 34 laterally across the magnetic tape 40. The motor 52 or other motor of the tape drive 12 may aid the actuator assembly 56. A controller 58 of the tape drive 12 may direct or determine the serial movement of the tape 40 as well as movement of the head 34. The controller 58 may be hardware, software, or a combination of hardware and software. In one embodiment, the controller 58 may be external to the tape drive 12. For example, the controller 58 may be located within another part of the computer system 10.

The tape drive 12 may also include an interface 60 to allow the tape drive 12 to interface with the computer system 10. In one example, the controller 54 may receive data from computer system 10 to be stored on magnetic tape 40 through the interface 56. The controller 58 may then direct head 34 to write the data to the magnetic tape 40, and to determine the position of the tape 40 when the tape 40 is later read.

In the writing operation, elements within the electromagnetic head 34 are selectively activated by electric currents which create magnetic flux patterns representing the data on the magnetic tape 40. The data can then be read from the magnetic tape 34 by moving the magnetic tape 40 past the head 34 elements again. In particular, the magnetic flux patterns recorded on the magnetic tape 40 will create electric signals in the head 34 elements, which can be read as the data.

In the illustrated embodiment, the stationary guides 36 are coupled to a non-moving portion (e.g., bracket 62) of the actuator assembly 56 via member 64 (e.g., a brace). Such a configuration where the guides 36 are fixed to a non-moving portion or part of the actuator assembly 56 may provide for a relatively precise alignment of the head assembly 32 with magnetic tape 40. In alternate embodiments, the position of the stationary guides 36 may move to some degree with the actuation of the head 34, and so on. Moreover, in other examples, the stationary guides 36 couple to another component instead of the actuator assembly 56, such as to an interior wall of the tape drive 12.

In operation of the tape drive 12, the tape 40 passes around the first tape guide 46, over the head assembly 32, and around a second tape guide 48 to the take up spool 50. Unfortunately, without the new stationary guides 36, because the tape guides 46 and 48 are disposed separately from the head assembly at a relatively long distance away from the head 34, the head 34 may tend to pull the tape with it when the head is moved laterally across the tape 40, causing undesirable lateral motion in the tape 40. Fortunately, as discussed below, the new stationary guides 36 mitigate some or all of this undesirable lateral motion of the magnetic tape 40.

The stationary guides 36 (see also FIGS. 3 and 4) disposed with the head assembly 32 support the tape 40 and help maintain an appropriate spacing or distance of the tape 40 from the head 34. Indeed, as indicated, with the stationary guides 36, the head 34 has less tendency or ability to pull the tape 40 with it when the head 34 is moved laterally across the tape by the actuator assembly 54. This improvement contributes to better tracking performance of the tape drive 12 to the tape 40. As discussed below, this beneficial reduction in lateral movement of the tape 40 and the associate increase in tracking performance increase the servo phase margin, a metric known in the art.

With regard to certain embodiments of servo phase margin, in a feedback control loop, phase margin is the phase (in degrees) at the zero decibel (db) crossover point of the open loop transfer function of the system. Phase margin generally indicates the margin against instability due to additional phase loss in the control loop. Phase margin may also indicate the amount of peaking or amplification the control loop will apply to input signals in a stable loop.

Figure 3:
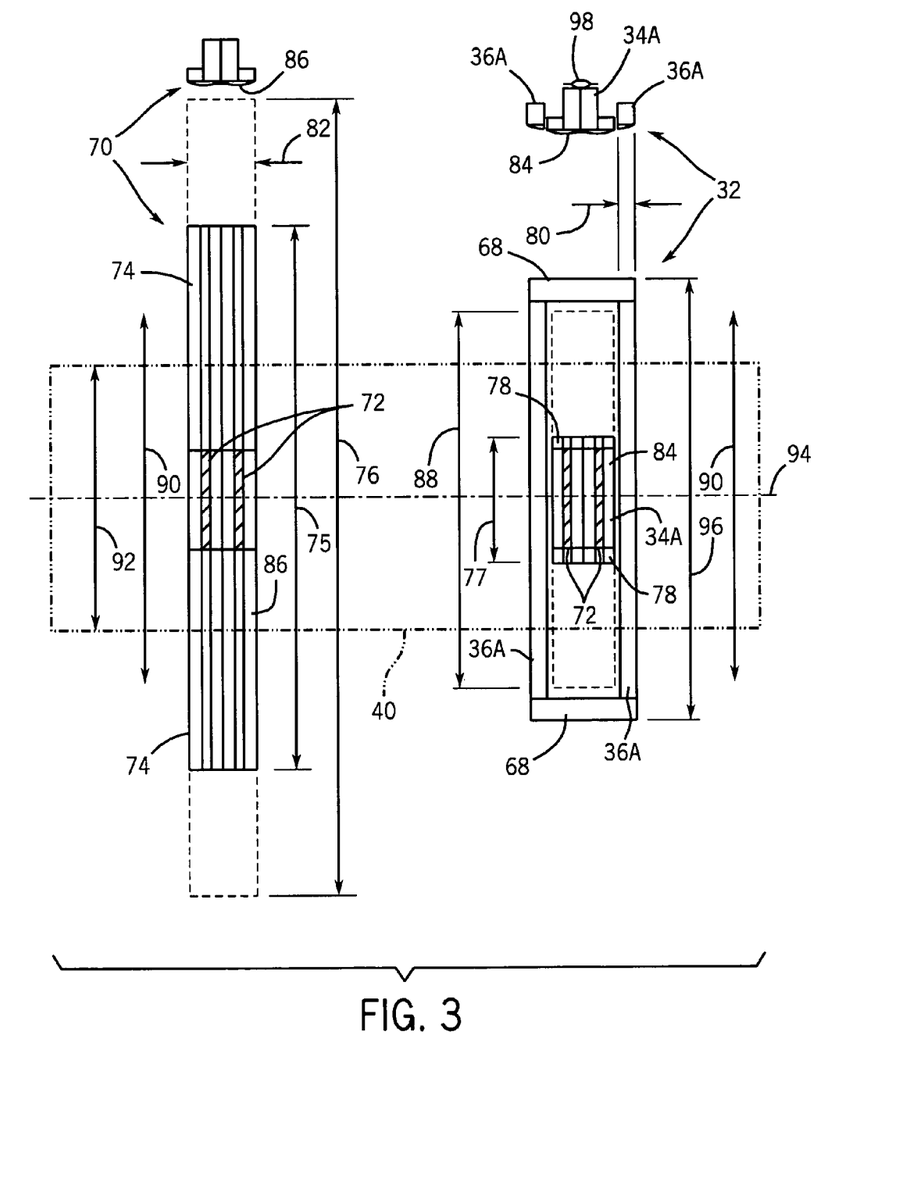
FIG. 3 is a diagrammatical representation of a tape head and stationary guides in a tape back-up drive in accordance with one embodiment of the present invention.

FIG. 3 depicts a head assembly 32 having a head 34A and two stationary guides 36A. Stabilization of the stationary guides 36A is facilitated by members 68 positioned at each end of the stationary guides 36A. The combined members 36A and 68 form a substantially rigid parallelogram of material providing consistent wrap of the tape 40 around the tape bearing surfaces of head 34A.

The new head assembly 32 is contrasted with a conventional head 70 without guides. Two views of both the head assembly 32 and conventional head 70 are given. The active part 72 of the head (denoted by cross-hatching) may be a silicone wafer, for example. The active portions 72 of heads 34A and 72 may be manufactured in a process similar to that of manufacturing an integrated circuit (IC) providing electromagnetic elements. The active part 72 or parts of the heads 34A and 70 may include an array of elements (e.g., voice coil, magneto resistive elements, etc.) into a larger structure of the head 34A and 70, a chipset integrated into a larger structure of the head 34A and 70, and the like.

Head designs (e.g., head 70) typically have an active portion 72 and two large blocks 74 of cermet on each end of the active portion 72. On the other hand, the active portion 72 may be combined or inserted in the middle of a long cermet bar to form the head 70, for example. The long head 70 including the cermet portions 74 generally supports the entire surface of the magnetic tape 40 throughout the full extent of the motion of the head 70. The friction applied to the tape 40 by the long conventional head 70 can cause the tape 40 to be pulled laterally. Further, the friction results in wear of the head 70. Consequently, the head 70 may need to be replaced within the life of the tape drive 12. Moreover, the long cermet portions 74 of the head 70 contribute to the material and manufacturing costs of the head 70.

In addition, the long cermet portions 74 (i.e., extensions) at the top and bottom of the active portion 72 of the head 70, as well as the associated travel 76 of the head 70, generally make difficult integration of conventional tape drives into half-height form factor products, for example. In some cases, holes are formed in the computer system enclosures or tape drive enclosures to provide adequate room for the head-actuator assembly of conventional tape drives. These long extensions 74 of the head 70 may add unnecessary mass, cost, and complexity to the head.

In contrast, the length 77 of the new head 34A is less than the length 75 of the conventional head 70. Indeed, the new head 34A is smaller and the surface area of the head 34A is smaller. Further, guides 36A of the head assembly 32 are fixed in this embodiment, reducing lateral displacement of the tape 40. The stationary guides 36A tend to hold the tape 40 in place and overcome lateral force that the moving head 34A might impart into the tape 40. In addition, the wear of the head 34A may be reduced due to less friction applied by the tape 40 to the head 34A.

The two additional blocks 78 of cermet, if any, at the ends of the active part 72 (i.e., array of elements) of head 34A will generally be smaller than conventional. Typically, the total length or height of head 34A is the combined length of the active portion 72 (e.g., the array of inductive write and magneto resistive read elements) plus the length of the two small addition blocks 78 of cermet at each end of the array of head 34A elements. In certain embodiments, the length of these two additional blocks 78 may be determined by the contour dynamics of the head 34A, the compliance of the magnetic tape 40, the configuration of the stationary guides 36A, and so on.

With respect to the stationary guides 36A, the width 80 of the stationary guides 36A may be varied according to the desired support of the tape 40, for example. In the depicted embodiment, the width 80 of the stationary guides 36A is 0.75 millimeters. In other embodiments, the guides 36A incorporate flanges to constrain or guide the edges of the magnetic tape 40.

The guides 36A may be mounted to the non-moving portions of the actuator assembly 56 (see FIG. 2) after the head 34A has been attached to the porter 58. In one example, once the relative alignment of the head 34A to the guides 36A has been established, the alignment of the guides 36A may then be congruent with that of the head 34A. In operation, the head 34A typically penetrates toward the tape 40 beyond the stationary guides 36A to accommodate head-to-tape spacing.

Both the head assembly 32 and the head 70 each have a width 82, which in the illustrated embodiment is 3.1 millimeters. In addition, while the active portions 72 of the heads 34A and 70 may remain the same length in the illustrated embodiment, but, again, the length/area of the head surfaces 84 and 86 is different. In the illustrated embodiment, the length 75 of the longer head 70 is 6 millimeters whereas the length 77 of the head 34A is 6 millimeters.

Thus, in this embodiment, a reduction of the head size is greater than 75%. Therefore, the amount of material used to manufacture head 34A is less than that used to manufacture the head 70. Moreover, as indicated, because the space to accommodate the travel 88 (distance or movement) of the head 34A is reduced, and the size of the tape drive 12 (see FIGS. 1 and 2) may also be reduced. Therefore, the tape drive 12 may more readily fit inside smaller expansion slots, for example, of computer system 10, (e.g., half-height form factor). In the illustrated embodiment, the travel 88 of the head 34A is 18 millimeters compared to a travel 76 of 38 millimeters for the head 70, a greater than 50% reduction. It should be noted that the travel 88 (e.g., 18 millimeters) of the head 34A is the head length 77 (e.g., 6 millimeters) plus the actuator stroke 90 (e.g., combined +/−6 millimeters equaling 12 millimeters). The travel 76 (e.g., 38 millimeters) of the conventional head 70 is its length 75 (e.g., 26 millimeters) plus the actuator stroke 90 (e.g., combined +/−6 millimeters).

Given that the head 70 assembly does not employ stationary guides, it will generally be longer that head 34 to support the tape 40 while accommodating the positioning the active portion 72 of the head 70 and the associated lateral movement of the head 70. In contrast, with the reduced-sized head 34A and the stationary guides 36A, the guides 34A support tape 40, and therefore facilitate a shorter length 76 of head 34A.

The magnetic tape 40 is depicted by dotted lines to show the proportional size of the heads 36A and 70 to the tape 40. The tape 40, in this embodiment, has a width 92 of 12.7 millimeters. The center line of the tape 40 is denoted by reference numeral 94. In the illustrated embodiment, the overall length 96 of the head assembly 32 including the head 34A, guides 36A, and members 68 is 21 millimeters, which is greater than the width of the tape 40. Lastly, it should be emphasized that the dimensions given in the present application for the various components discussed are only exemplary and not meant to limit the disclosed techniques.

The alignment and penetration of the head 34A relative to the guides 36A in directions both along the tape 40 travel axis and perpendicular to the tape 40 travel axis may be important to the performance of the system. This alignment may be performed by a manual adjustment process or via a dynamic head mounting apparatus 98 that allows the head 34A to nest in a specified place under tension of the magnetic tape 40. The head mounting apparatus 98 may incorporate a gimbal structure, for example. A gimbal may be employed to establish the contact pressure of the head 34A to the tape 40.

Figure 4:
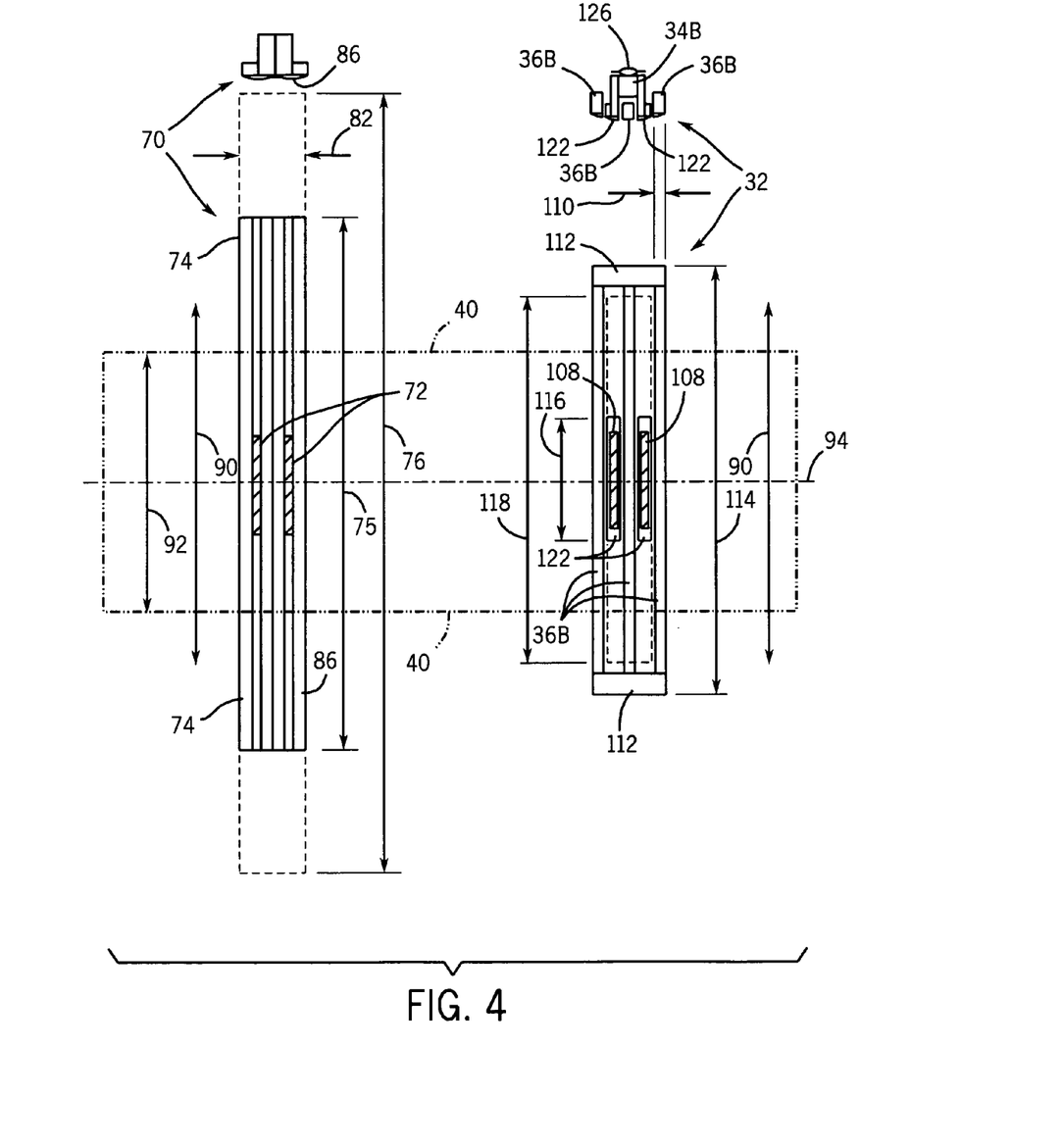
FIG. 4 is a diagrammatical representation of a tape head and stationary guides in a tape back-up drive in accordance with one embodiment of the present invention.

FIG. 4 depicts an alternate embodiment of the head assembly 32. As in FIG. 3, the depicted embodiment is contrasted against a head 70. In this example, the head assembly 32 includes a head 34B and three stationary guides 36B (e.g., rails). A benefit of a "tri-rail" design relative to the embodiment depicted in FIG. 3 is that the penetration of the head 34B chip(s) or elements (i.e., active portions 108) into the tape 40 may be reduced. This typically lowers the coupling between the intended lateral motion of the head 34B and the resultant undesirable lateral motion of the tape 40.

As with many LTO heads, the head 34B contains two separate active portions 108 (denoted by cross-hatching in FIG. 4) of the active part of head 34B. These two portions 108 (each including an array of elements) may act independently to a large extent. One array of elements writes data to the tape and the other array of elements may perform a verification of the written data, for example. It should be noted that the stationary guide 36A disposed in the middle (i.e., between the active portions 108) generally does not interfere undesirably with the operation of the head 34B.

The length of the guides 36B is designated by the reference numeral 110 and is 0.75 millimeters in this embodiment. The guides 36B are supported by members 112 disposed at the ends of the guides 36B. The length of the guides 36B is denoted by the reference numeral 114. In this embodiment, the length 114 is 21 millimeters. The length 116 of the new head 34B is 6 millimeters and the travel 118 of the movement of the head 34B is 18 millimeters in this example. As with the embodiment depicted in FIG. 3, the travel 118 of the head 34B is reduced by greater than 50% as compared to the conventional head 70. Therefore, relatively smaller size tape drives 12 may be manufactured. Such drives 12 may fit into smaller expansion slots or housings of computer system 10. Again, the active portions 108 of the head 34B are denoted by cross hatching on the surface 122 of head 34B. As with the embodiment of FIG. 3, the actuator stroke 90 is +/−6 millimeters.

The present embodiment may also have a dynamic head mounting apparatus 126 which may include a gimbal structure, for example. Again, such a gimbal structure may be employed that facilitates establishing the contact pressure of the head 34B to the magnetic tape 40. However, such a head mounting apparatus is not required by the present techniques. As discussed, the alignment and penetration of the head 34B relative to the guides 36A in the tape travel axis and the perpendicular axis are beneficial to the performance of the tape drive 12 system. Again, this alignment can be performed by a manual adjustment process or via dynamic head mounting apparatus 126 that facilitates the head in the appropriate place under tension of the magnetic tape 40.

Referring to FIGS. 3 and 4, generally, the disclosed techniques typically enable a reduction in head height of 25% or greater of conventional LTO heads, a 50% or greater reduction of top to bottom excursion of the LTO head, and a reduced total actuator height. A reduction of the actuator height is beneficial generally to the integration of the head 34 into smaller tape drives 12. Other advantages of the disclosed techniques over conventional designs may include reduced mass (e.g., smaller head, smaller actuator, etc.), improvements in tape tracking performance, potential for head and mechanism cost reduction, and improvements in head life and reliability.

The outer stationary guides 36 are typically positioned at a distance from each other that is slightly greater than the width of the tape 40. In FIGS. 3 and 4, the length of the guides 36 (e.g., 36A and 36B) is depicted as extending beyond the actuator stroke 90. As indicated, in one embodiment of the present guide design, flanges may be incorporated on the guides 36 at the top and bottom of the tape 40 to constrain or engage the edges of the tape 40.

As mentioned, the disclosed techniques may also improve tape 40 tracking performance. For example, the guides 36 may reduce undesirable lateral movement of the tape 40, therefore improve the metric known as servo phase margin. In certain embodiments of the head assembly 32 design, a 20% or more improvement in servo phase margin may be realized within the tape drive 12. A reason for this improvement is that the guides 38 and 42 separate from the head assembly 32 (see FIG. 2) are a relatively long distance away from the head 34. In other words, during operation of the tape drive 12, when the head moves up and down it may tend to pull the tape 40 with it to some extent, causing undesirable lateral motion in the tape 40. However, with the new stationary guides 36, some or all of this lateral motion is mitigated. The head has less tendency or ability to pull the tape 40 with it when the head is actuated up and down. Again, this contributes to the gain in servo phase margin improvement.

In sum, with regard to the various embodiments of FIGS. 3 and 4, the guides 36 (e.g., 36A and 36B) may provide for several improvements to the tape drive 12. For example, the guides 36 beneficially enable employment of a smaller head 34, and therefore potentially reduce the manufacturing cost of tape drive 12. Further, as indicated, the guides 36 provide for less movement of head 34. A smaller head 34 combined with less excursion of the head 34 within tape drive 12 makes possible manufacture of a smaller tape drive 12 (e.g., a half-height form factor), thereby facilitating a geometrical fit of the tape drive 12 in smaller computer systems 10 and smaller expansion slots. Moreover, the guides 36 may provide for less wear of the head 34 and therefore a longer life of the head 34. In addition, again, the guides 36 may provide for more precise engagement of the head 34 with the magnetic tape 40 and a reduction in undesirable lateral movement of the tape 12, thereby improving tracking performance of the tape drive 12. Overall, the present techniques may provide for reduced mass of head 34 and associated actuator, increase in head 34 life and reliability, potential for cost reduction of head 34 and tape drive 12, improvement in tape 12 tracking performance, and so on.

The disclosed techniques allow for the individual optimization of the head and guide structures. For example, future tape 40 compositions will bring increased challenges such as managing the head/tape spacing by balancing the stickiness of the tape with the thickness of the lubricant. Tape 40 can generally adhere to the head surface while the tape is not in motion. Lubricant is a beneficial element of the tape 40 but has the adverse effect of increasing the head 32/tape 40 separation, and thus degrading the capability to achieve high linear densities, for example. In response, the stationary guides 36 may be composed of material, (e.g., steel, ceramic, ferrite, Delrin™, sapphire, and/or have surface finish such as grooves or roughness, and so forth) that is less prone to tape 40 sticking, and therefore facilitate use of tape 40 having less lubricant. Moreover, in certain embodiments, the head 40 may be retracted from contact with the tape 40 while the tape is stopped, thus preventing the tape 40 from sticking to the head 34. When tape motion is resumed, the head 34 could be brought back into contact with the tape 40.

Lastly, in the production of half-height tape drives 12, the disclosed embodiments of the actuator assembly (e.g., actuator assembly 56) may be installed within the half-height tape drives 12 without having to cut openings into the base plate of the tape drive 12, for example. In additional embodiments, a solid sheet of metal may be added underneath the tape drive 12 to add stiffness. Such added stiffness improves tracking performance of the tape drive 12 due to the increased rigidity (i.e., stabilization) of the tape drive 12.

What is claimed is:

1. A tape drive comprising:
a head configured to read data from a tape and to write data to the tape, wherein the head comprises a first active portion and a second active portion;
a motor configured to move the tape past the head;
an actuator assembly configured to move the head laterally across a width of tape; and
a plurality of stationary guides configured to support the tape, wherein the stationary guides are coupled to the actuator assembly, wherein one of the plurality of stationary guides is a rail disposed between the first active portion and the second active portion of the head.

2. The tape drive of claim 1, wherein a length of the stationary guides is greater than a width of the tape.

3. The tape drive of claim 1, wherein a length of the stationary guides is equal to or greater than a stroke of an actuator of the actuator assembly.

4. The tape drive of claim 1, wherein the head is configured to read and write data on a magnetic material of the tape.

5. The tape drive of claim 1, wherein the plurality of stationary guides comprises three stationary guides.

6. The tape drive of claim 1, wherein one of the stationary guides comprises flanges.

7. The tape drive of claim 6, wherein the flanges are configured to engage an edge of the tape.

8. A computer system, comprising:
a processor; and
a tape drive comprising a head assembly comprising:
   a head configured to read data from a tape and to write data to the tape, wherein the head comprise a first active portion and a second active portion; and
   a first tape guide configured as a rail and disposed between the first active portion and the second active portion such that the tape passes across the first tape guide during operation but the first tape guide does not interfere with operation of the head.

9. The computer system of claim 8, wherein the first tape guide is stationary with respect to the tape.

10. The computer system of claim 8, wherein the tape drive comprises an actuator configured to position the head laterally with respect to the tape.

11. The computer system of claim 10, wherein the first tape guide is coupled to the actuator.

12. The computer system of claim 11, wherein the head comprises a second tape guide and a third tape guide.

13. The computer system of claim 12, wherein the second tape guide and the third tape guide are disposed to the outside of the head.

14. The computer system of claim 12, wherein the second tape guide and the third tape guide are coupled to the actuator.

15. The computer system of claim 8, wherein the first tape guide comprises a rail.

16. The computer system of claim 8, wherein the tape drive comprises a motor configured to drive the tape serially past the head.

17. A method of operating a computer tape drive, comprising:
   moving a tape serially pass a head configured to read data from the tape and write data to the tape;
   supporting the tape during movement with at least two guides disposed adjacent to the head;
   positioning the head laterally with respect to the tape;
   moving a portion of the head at least partially past the at least two guides to read data from the tape or to write data to the tape; and
   supporting the rape during movement with a third guide contacting the tape and disposed beneath the tape and between two active portions of the head.

18. The method of claim 17, wherein the at least two guides are stationary with respect to the tape.

\* \* \* \* \*

UNITED STATES PATENT AND TRADEMARK OFFICE
CERTIFICATE OF CORRECTION

PATENT NO. : 7,656,614 B2
APPLICATION NO. : 11/528215
DATED : February 2, 2010
INVENTOR(S) : Lawrence A. Hansen et al.

It is certified that error appears in the above-identified patent and that said Letters Patent is hereby corrected as shown below:

In column 10, line 18, in Claim 17, delete "rape" and insert -- tape --, therefor.

Signed and Sealed this

Twenty-ninth Day of June, 2010

David J. Kappos
*Director of the United States Patent and Trademark Office*